United States Patent
Li et al.

(10) Patent No.: US 7,453,961 B1
(45) Date of Patent: Nov. 18, 2008

(54) METHODS AND APPARATUS FOR DETECTION OF SIGNAL TIMING

(75) Inventors: Don Li, Somerset, NJ (US); Dennis D McCrady, Holmdel, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 578 days.

(21) Appl. No.: 11/032,025

(22) Filed: Jan. 11, 2005

(51) Int. Cl.
*H04L 27/06* (2006.01)

(52) U.S. Cl. ........................ 375/343; 375/340

(58) Field of Classification Search ............... 375/142, 375/144, 147, 148, 150, 316, 343, 355, 346; 370/335, 342; 455/296
See application file for complete search history.

(56) References Cited

U.S. PATENT DOCUMENTS

| | | | |
|---|---|---|---|
| 5,365,544 A | 11/1994 | Schilling | |
| 5,436,942 A | 7/1995 | Cheng et al. | |
| 5,742,635 A | 4/1998 | Sanderford, Jr. | |
| 5,764,686 A | 6/1998 | Sanderford et al. | |
| 5,874,916 A | 2/1999 | Desiardins | |
| 5,883,598 A | 3/1999 | Parl et al. | |
| 5,982,324 A | 11/1999 | Watters et al. | |
| 6,031,882 A * | 2/2000 | Enge et al. ........... | 375/343 |
| 6,185,427 B1 | 2/2001 | Krasner et al. | |
| 6,208,297 B1 | 3/2001 | Fattouche et al. | |
| 6,249,252 B1 | 6/2001 | Dupray | |
| 6,275,705 B1 | 8/2001 | Drane et al. | |
| 6,304,216 B1 | 10/2001 | Gronemeyer | |
| 6,453,168 B1 | 9/2002 | McCrady et al. | |
| 6,466,161 B2 | 10/2002 | Turetzky et al. | |
| 6,549,594 B1 | 4/2003 | Chen et al. | |
| 6,606,349 B1 | 8/2003 | Kudhrethaya et al. | |
| 6,683,924 B1 * | 1/2004 | Ottosson et al. ........ | 375/343 |
| 6,801,728 B2 | 10/2004 | Taguchi et al. | |
| 2001/0053699 A1 | 12/2001 | McCrady et al. | |

(Continued)

FOREIGN PATENT DOCUMENTS

EP 1 118 871 A2 7/2001

(Continued)

OTHER PUBLICATIONS

Peterson, et al., *Spread Spectrum Indoor Geolocation*, National Journal of the Institute of Navigation, vol. 45, No. 2, pp. 97-102 (1998).

*Primary Examiner*—David C. Payne
*Assistant Examiner*—Leon Flores
(74) *Attorney, Agent, or Firm*—Edell, Shapiro & Finnan, LLC (57) ABSTRACT

A technique is described for determining the timing of a received signal that includes one or more time-delayed versions of a reference signal traveling over respective different signal paths. The technique includes correlating the received signal with the reference signal to produce a correlated signal; determining whether the correlated signal includes a signal peak that corresponds to the direct path of the received signal; and iterative repeating these operations until a signal peak is determined to correspond to the direct path of the received signal. In each successive iteration, the reference signal corresponding to at least the greatest signal peak in the correlated signal is regenerated, and contributions from each regenerated reference signal are removed from the received signal prior to correlating the received signal in the next iteration.

17 Claims, 5 Drawing Sheets

U.S. PATENT DOCUMENTS

| | | |
|---|---|---|
| 2002/0075182 A1 | 6/2002 | Sheynblat |
| 2002/0118723 A1 | 8/2002 | McCrady et al. |
| 2002/0155845 A1 | 10/2002 | Martorana |
| 2003/0012266 A1 | 1/2003 | Gilmour et al. |
| 2003/0017832 A1 | 1/2003 | Anderson et al. |
| 2003/0022627 A1 | 1/2003 | Fernandez-Corbaton et al. |
| 2003/0054845 A1 | 3/2003 | Krasny et al. |
| 2003/0072356 A1 | 4/2003 | Abraham et al. |
| 2003/0092448 A1 | 5/2003 | Forstrom et al. |
| 2003/0144011 A1 | 7/2003 | Richards et al. |
| 2003/0146871 A1 | 8/2003 | Karr et al. |
| 2003/0201935 A1 | 10/2003 | King et al. |
| 2004/0223540 A1 * | 11/2004 | Shan .......................... 375/150 |

FOREIGN PATENT DOCUMENTS

GB    2 391 140 A    1/2004

* cited by examiner

METHODS AND APPARATUS FOR DETECTION OF SIGNAL TIMING

BACKGROUND OF THE INVENTION

1. Field of the Invention

The present invention relates to methods and apparatus for measuring signal timing and, more particularly, to techniques for accurately identifying a direct path signal in the presence of multipath signals.

2. Description of the Related Art

Accurate determination of signal timing is desirable in a wide variety of communication and navigation applications where precise, reliable signal reception is desired. For example, U.S. Pat. Nos. 6,453,168 and 6,801,728, the disclosures of which are incorporated herein by reference in their entireties, disclose state-of-the-art position location and communication systems that provide accurate, reliable three-dimensional position determination of a handheld or portable, spread spectrum communication device within milliseconds without interruption of voice or data communications. Using spread spectrum waveforms and processing techniques, the system is capable of determining position location to an accuracy of less than ten centimeters in a severe multipath channel particularly found in urban indoor environments and provides communications performance commensurate with the modulation and error correction coding used in such environments.

Among techniques employed to determine the position of a mobile communication device is the reception at the mobile communication device of multiple timing signals respectively transmitted from multiple transmitters at different, known locations (e.g., global positioning system (GPS) satellites or ground-based transmitters). By determining the range to each transmitter from the arrival time of the timing signals, the mobile communication device can compute its position using trilateration. When measuring the range to an object or another device, a precise determination of the signal propagation time between the devices must be made. The signal propagation time can be derived by knowing the transmission and reception times of one or more ranging signals traveling along a direct path between the devices. For example, the well-known global positioning system (GPS) relies on measurement of the one-way propagation time of signals sent from each of a set of satellites to a receiving device in order to determine the range to each satellite and the position of the receiving device.

The accuracy and operability of such position location techniques can be severely degraded in the presence of multipath interference caused by a signal traveling from a transmitter to the receiver along plural different paths, including a direct path and multiple, longer paths over which the signal is reflected off objects or other signal-reflective media. Unfortunately, multipath interference can be most severe in some of the very environments in which position location techniques would have their greatest usefulness, such as in urban environments and/or inside buildings, since artificial structures create opportunities for signals to be reflected, thereby causing signals to arrive at the receiver via a number of different paths.

The position determining systems described in the aforementioned patents rely on a two-way, round-trip ranging signal scheme. Specifically, a master mobile communication device transmits outbound ranging signals to plural reference communication devices which respond by transmitting reply ranging signals that indicate the location of the reference radio and the signal turn around time (i.e., the time between reception of the outbound ranging signal and transmission of the reply ranging signal). Upon reception of the reply ranging signal, the master radio determines the signal propagation time, and hence range, by subtracting the turn around time and internal processing delays from the elapsed time between transmission of the outbound ranging signal and the time of arrival of the reply ranging signal. In this manner, the individual radios do not need to be synchronized to a common time reference, thereby eliminating the need for highly accurate system clocks required in conventional time-synchronized systems. The brief ranging messages can be interleaved with voice and data messages in a non-intrusive manner to provide a position determining capability without disruption of voice and data communications.

To provide high accuracy range estimates, the time of arrival (TOA) of the ranging messages are precisely estimated. By performing internal delay calibration, errors caused by difficult-to-predict internal transmitter and receiver delay variations can be minimized. The system uses state-of-the-art spread spectrum chipping rates and bandwidths to reduce multipath interference, taking advantage of existing hardware and software to carrying out a portion of the TOA estimation processing. Frequency diversity can be used to minimize deep fades on the direct path to ensure an accurate TOA range estimate.

The accuracy of the position determined by these systems depends largely on the accuracy with which the receiving devices can determine the time of arrival of the ranging signals traveling along a direct path between the devices. In an environment where multipath interference is significant, it is possible to mistakenly identify a strong multipath signal as the direct path signal. Since a multipath signal travels along an indirect path between the transmitter and receiver, the signal propagation time and, hence, the observed range differ from that of the direct path. In a position determining system relying on precise measurements of direct-path signal propagation time to determine range, erroneously interpreting a multipath signal as the direct path signal can drastically degrade performance. In particular, a multipath signal may result in a severely erroneous range measurement; nevertheless, if the multipath signal has a relatively high signal-to-noise ratio, the erroneous range measurement will be reported to the tracking filter as being highly accurate. Consequently, the filter will be misled into placing a high degree of reliance on a severely erroneous range measurement, thereby degrading the accuracy of the position estimate without the degraded accuracy being immediately known or reported.

In GPS systems, the transmitter/receiver systems attempt to perform time-of-arrival (TOA) determination on the GPS spread-spectrum waveform by correlating the received signal with a replica of the transmitted signal and then finding the time location of the peak magnitude of the correlation. These systems either locate the peak directly or by curve-fitting an ideal correlation function (a triangular pulse) with the actual received signal correlation function. Three recent innovations in receiver technology improve the TOA estimation accuracy of the GPS receiver in a multipath environment. First, narrow correlators use a correlator spacing of a fraction of a chip rather than chip-spaced correlators. This greatly reduces the magnitude of the maximum TOA error in ranging. Second, a multipath estimating delay lock loop (DLL) can be used, which assumes that no more than a certain number (e.g., two) of dominant multipath signals are present. The DLL estimates the amplitude, delay, and phase of each multipath component using maximum likelihood criteria. Each estimated multipath correlation function is then subtracted from the measured correlation function. The remaining direct path correlation function has minimal multipath degradation, and it can be used for accurate TOA estimation. Finally, leading edge curve fitting can be used to match the received signal correlation with an ideal correlation function on the leading edge of the received signal correlation. This minimizes the impact of any delayed multipath signals when computing the TOA, because the multipath has its greatest influence on the trailing edge of the correlation.

A good strategy to improve position accuracy is to increase both bandwidth and signal-to-noise ratio (SNR). Ideally, increasing bandwidth is the best way to improve accuracy because of the inverse square root relationship of improved accuracy with increasing SNR. However, it is not always feasible to obtain a frequency allocation with enough bandwidth to support the desired location determining accuracy, particularly in view of increasing demands on available frequency spectrum.

It would be advantageous in the system described above to boost the weak but desirable signals (e.g., the direct-path signal) for achieving the desired location estimation accuracy. The need to boost the direct-path signal in the pool of multiple received signals is much more evident in the indoor environment where it is not uncommon for the direct path to be tens of dB down from the dominant reflected paths. Inside a building, a direct path from the outside may go through several walls to reach the intended receiver located in a room, and could subsequently be buried by a strong or several strong reflected paths that hit an adjacent building and bounce back through a window to the same receiver. The difference in power between the direct path and the reflected path can be very large. This is one of the challenging problems in indoor ranging.

The aforementioned techniques of using a narrow correlator technique and a multipath estimating delay lock loop can not overcome the tremendous power disadvantage suffered by the direct-path signal in the severe indoor multipath channel mentioned above, which inherently limits the TOA ranging estimate accuracy.

Sending the ranging waveform at different carrier frequency as in Quadrature Multi-Frequency Ranging (QMFR) alone will not solve this particular problem either, because the direct path may again suffer large attenuation as a result of by going through several walls. Frequency diversity, on the other hand, can reduce the probability of the direct-path signal suffering deep fades along with other reflected paths. Nevertheless, there remains a need to improve the capability of accurately detecting the presence and timing of a direct-path in severe multipath environments in a variety of communication and navigation applications.

SUMMARY OF THE INVENTION

In accordance with one aspect of the present invention, there is provided an apparatus for determining the timing of a received signal, the received signal including one or more time-delayed versions of a reference signal traveling over respective different signal paths. The apparatus includes: a correlator that iteratively correlates the received signal with the reference signal to produce a correlated signal; and a processor that iteratively modifies the received signal supplied to the correlator until the processor determines that the correlated signal includes a signal peak corresponding to a direct path of the received signal (the direct path provides the timing of the received signal, which can be a time-of-arrival ranging signal), wherein in each iteration, the processor regenerates the reference signal corresponding to at least the greatest signal peak in the correlated signal and modifies the received signal supplied to the correlator to remove contributions from the regenerated reference signals, such that the correlated signal in successive iterations excludes contributions from signals determined in previous iterations not to correspond to the direct path.

The apparatus can further include a filter that emphasizes one or more signal peaks in the correlated signal, wherein the signal peaks correspond to potential signal paths of the received signal. For example, the filter can include a coarse filter and a fine filter that filter the correlated signal by masking portions of the correlated signal outside the vicinity of signal peaks, wherein the fine filter has a narrower time-domain filtering window than the coarse filter. More particularly, in the case of a spread spectrum signal, the filter can include a chip-level energy extractor that emphasizes the correlated signal in peak chips containing signal peaks by reducing the amplitude of the correlated signal in other chips, and a sample-level energy extractor that emphasizes the correlated signal in peak samples in the peak chips by reducing the amplitude of other samples in the peak chips.

In each iteration, the correlator can correlate the received signal in a plurality of sequential frames, with each frame including N samples corresponding to a correlation length of the correlator. In this case, the processor includes: a non-coherent integrator that integrates energy of signal peaks from the plurality of sequential frames to produce averaged signal peaks; a path searcher that determines whether one of the averaged signal peaks corresponds to the direct path; a path regenerator that regenerates the reference signal corresponding to at least the averaged signal peak having the highest energy when the path searcher has not determined one of the averaged signal peaks to correspond to the direct path; and a subtractor that subtracts each regenerated reference signal from the received signal prior to supplying the received signal to the correlator for a subsequent iteration. The path regenerator regenerates the reference signal from the amplitude, phase, and timing of peak signals in the correlated signal that have not been determined to correspond to the direct path.

The received signal can be a spread spectrum signal, such as a time-of arrival ranging signal used in navigation. The apparatus can be modem, such as that found in two-way communication devices, or, more generally, a receiver in a device capable of receiving (but not necessarily transmitting) signals.

In accordance with another aspect of the invention, there is provided a method for determining the timing of a received signal, wherein the received signal including one or more time-delayed versions of a reference signal traveling over respective different signal paths. The method includes: (a) correlating the received signal with the reference signal to produce a correlated signal; (b) determining whether a signal peak of the correlated signal corresponds to the direct path of the received signal (the direct path provides the timing of the received signal); and (c) iteratively repeating (a) and (b) until a signal peak is determined to correspond to the direct path of the received signal, wherein each successive iteration includes: regenerating the reference signal corresponding to at least the greatest signal peak in the correlated signal; and eliminating from the received signal contributions from each regenerated reference signal, such that the correlated signal in successive iterations excludes contributions from signals determined in previous iterations not to correspond to the direct path.

The method can further include filtering the correlated signal to emphasize one or more signal peaks in the correlated signal, wherein the signal peaks correspond to potential signal paths of the received signal. The filtering can involve coarsely filtering the correlated signal by masking portions of the correlated signal outside the vicinity of signal peaks, and then finely filtering the correlated signal by masking portions of the correlated signal closer to the signal peaks than those portions masked by coarse filtering. More specifically, in the case of spread spectrum signals, the filtering can include extracting energy of the correlated signal at a chip level to emphasize the correlated signal in peak chips containing signal peaks, and then extracting energy of the correlated signal at a sample level to emphasize the correlated signal in peak samples in the peak chips.

In each iteration, the method can include: correlating the received signal in a plurality of sequential frames, where each frame including N samples corresponding to a correlation length; integrating energy of signal peaks from the plurality of sequential frames to produce averaged signal peaks; determining whether one of the averaged signal peaks corresponds to the direct path; in response to no determination that one of the averaged signal peaks corresponds to the direct path, regenerating the reference signal corresponding to at least the averaged signal peak having the highest energy; and subtracting each regenerated reference signal from the received signal to be correlated in a subsequent iteration. The regenerated reference signal can be regenerated from the amplitude, phase, and timing of peak signals in the correlated signal that have not been determined to correspond to the direct path.

In accordance with yet another aspect of the invention, there is provided an apparatus for determining the timing of a received signal, wherein the received signal including one or more time-delayed versions of a reference signal traveling over respective different signal paths. The apparatus includes: means for iteratively correlating the received signal with the reference signal to produce a correlated signal; means for determining whether the correlated signal includes a signal peak corresponding to a direct path of the received signal, wherein correlation iterations cease once a signal peak is determined to correspond to the direct path; means for regenerating, in each iteration, the reference signal corresponding to at least a greatest signal peak in the correlated signal in response to no signal peak being determined to correspond to the direct path; and means for modifying, in each iteration, the received signal to be correlated to remove contributions from the regenerated reference signals, such that the correlated signal in successive iterations excludes contributions from signals determined in previous iterations not to correspond to the direct path.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DETAILED DESCRIPTION

The invention overcomes the aforementioned problem of strong multipath signals by iteratively subtracting the estimated strong-path signals from a received signal at the input of a correlator. When M number of signals from dominant paths are present in the correlator, each path's signal can be accurately estimated with its magnitude and phase, and the contributions of these signals to the total received signal can be completely eliminated. As a result, only the desired path signal such as the direct path is left at the correlator output.

Detecting an individual path among many paths is achieved by utilizing the symmetric property of the auto-correlation function of a spread-spectrum waveform. The triangular shape of the correlation function provides the opportunity to process the shape to extract the desired path by enhancing its correlation value at the path position and at the same time to suppress the other paths' interference. However, a simple one-stage processing of the correlation function may not be adequate to retrieve a deeply buried signal in a severe indoor multipath channel for which a 20 dB power difference is not uncommon. A much more robust processing technique is required for such circumstances.

According to the invention, the iterative detection of dominant multipath signals is accomplished by a serialized energy detector which includes two energy extractors. The first energy extractor operates at the chip level, and the second energy extractor operates at the sample level. The technique can estimate the multipath signal with great accuracy to aid the task of boosting the direct-path signal and at the same time suppressing the other paths' interference to achieve very accurate range estimate under the most severe indoor multipath channel conditions.

Figure 1:
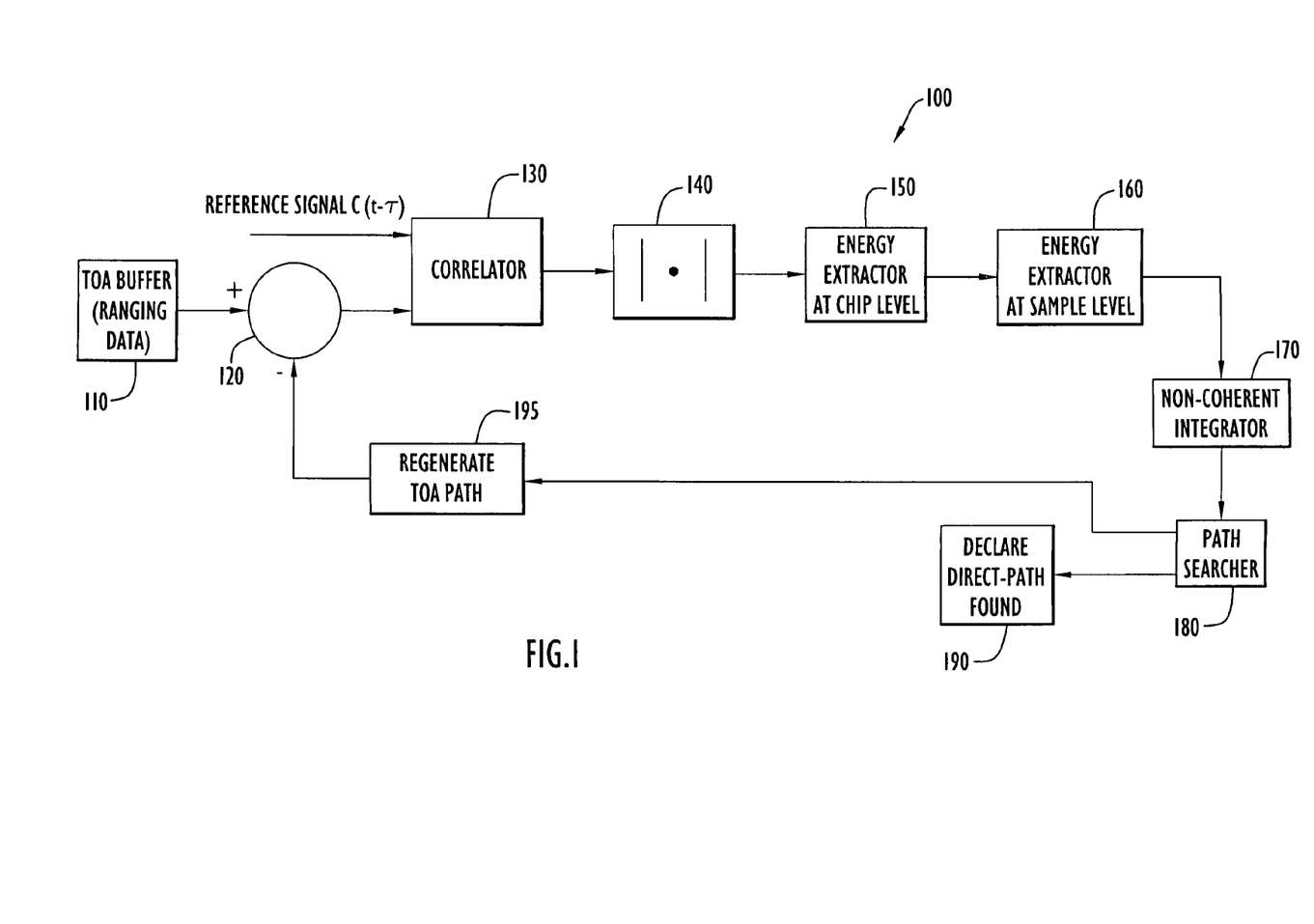
FIG. 1 is a functional block diagram illustrating an iterative detection technique in accordance with an exemplary embodiment of the present invention.
Figure 2:
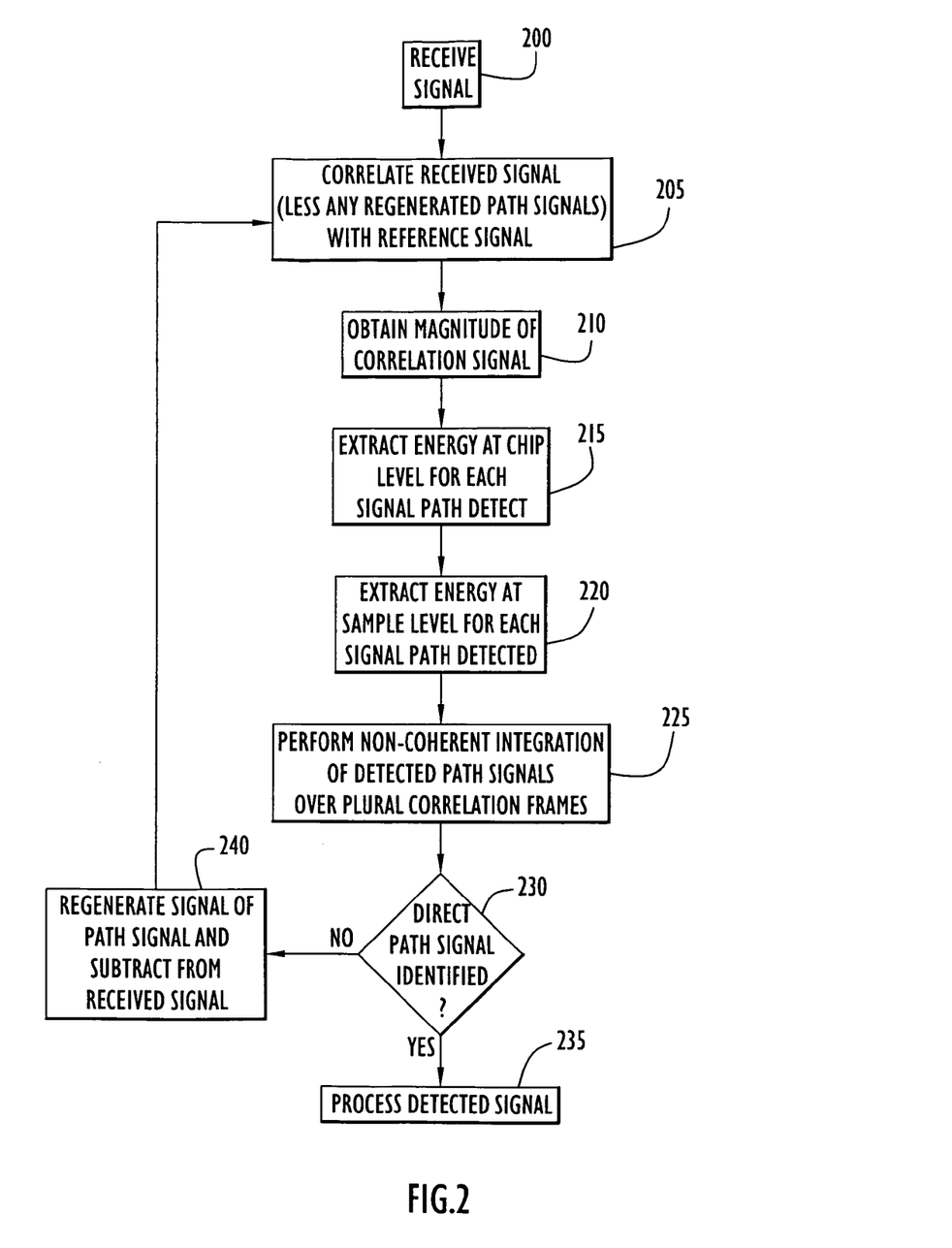
FIG. 2 is a functional flow diagram illustrating operations of the iterative detection technique according to an exemplary embodiment of the present invention.

The following detailed explanation of FIGS. 1-4 and of the preferred embodiments reveal the methods and apparatus of the present invention. A functional block diagram illustrating the iterative detection technique is shown in FIG. 1. A corresponding flow diagram illustrating the operations of the iterative detection technique is shown in FIG. 2. A received signal, which can be, for example, a time-of-arrival (TOA) ranging waveform, is digitized and stored in a buffer 110 as ranging data (operation 200 in FIG. 2). The technique of the present invention is particularly useful with TOA ranging signals, since very accurate determination of the timing of such signals is critical in ranging and position determining applications. However, it will be appreciated that the iterative detection technique of the present invention can be applied to any of a variety of signals, such as navigation and communication signals, particularly where accurate determination of signal timing may be advantageous and particularly in environments that suffer from multipath interference.

Moreover, the iterative detection technique of the present invention can be implemented in virtually any communication device. As used herein and in the claims, a communication device is any device capable of transmitting and/or receiving signals, including but not limited to: a fixed-position or mobile RF transmitter, a handheld or body-mounted radio; any type of wireless telephone (e.g., analog cellular, digital cellular or satellite-based); a pager or beeper device; a PDA; a radio carried on, built into or embedded in a ground-based or airborne vehicle; a satellite-mounted transmitter or receiver; any electronic device equipped with wireless transmission capabilities, including multimedia terminals capable of transmitting audio, video and data information; devices used in ground-based, airborne and/or space-based navigation (e.g., GPS-related devices); and devices capable of performing communication and navigation operations.

Referring again to FIG. 1, the TOA ranging data is supplied to a subtractor 120, which can be implemented in hardware or software. As will be described in greater detail, subtractor 120 subtracts from the TOA ranging data one or more replicas of the signal waveform corresponding to the discovered TOA paths, which are essentially regenerated by selecting the appropriate timing, phase, and amplitude of the waveform replicas. Each time the TOA processor is triggered to determine the timing of new TOA ranging data, one or more iterations of the TOA processing may be performed. On the initial correlation or "first pass" of the TOA ranging data, subtractor 120 supplies the TOA ranging data to a correlator 130 without subtracting any regenerated TOA path signals from the TOA ranging data.

Correlator 130 correlates the received TOA ranging data with the reference spreading code, C(t-t) (operation 205 in FIG. 2). As will be described in greater detail, with each received signal, several successive symbol blocks or "frames" of data of length N are correlated in this manner during each iteration, and the resulting correlator output from these frames is later combined in post processing to determine the presence of signals from one or more signal paths. By way of a non-limiting example, the received signal can be processed as twenty frames of data, with each frame including a number of samples equal to the length of the correlation function performed by the correlator.

The magnitude of the correlation signal is determined by applying an absolute value function, represented by block 140 in FIG. 1 and operation 210 in FIG. 2, to the output of the correlator 130. The correlation function essentially produces a triangular-shaped waveform across a number of samples, with the signal peak occurring at the sample value corresponding to the time of arrival of the signal at the receiver relative to the reference signal timing. Where a direct path signal and one or more multipath signals arrive at the receiver, the profile of the correlator output may include more than one peak corresponding to the arrival time of the signals traveling along different paths.

An energy detector, comprising a chip-level energy extractor 150 and a sample-level energy extractor 160, analyzes the magnitudes of the samples to identify and isolate the samples in the correlation waveform that potentially correspond to signals arriving from different signal paths. The chip-level energy extractor 150 isolates the paths separated by at least one chip, while the sample-level energy extractor 160 refines the estimated range with a resolution at the sample level. In the chip-level energy extractor 150, a mask is placed at the center of the detected correlation peak to enhance its correlation value and at the same time nulls on the interference from other paths (operation 215 in FIG. 2). In the sample-level energy extractor 160, a different mask is placed at the center of the detected path to enhance its correlation value and at the same time to null the interference within the same chip (operation 220 in FIG. 2). A single chip may include, for example, eight samples, such that the sample-level energy extractor 160 provides significantly greater granularity than the chip-level energy extractor 150. Thus, in relative terms, the chip-level energy extractor 150 operates as an initial coarse energy extractor or mask, while the sample-level energy extractor 160 operates as a subsequent fine energy extractor or mask.

The masks of the energy extractors are essentially time-domain filters which selectively apply weights to the correlator output samples to enhance the correlation value and null interference from other paths. The masks preferably have a skirt-shape time response centered at the peak. As the mask extends away from the peak, the attenuation applied to the signal is greater. The masks are placed on each detectable multipath signal in the correlator output, e.g., each peak that exceeds a threshold value. Thus, if there are M multipath signals detected, there will be M masks deployed simultaneously to sharpen each signal at the chip level and then at the sample level to produce a cleaner copy of each multipath signal for subsequent processing.

The output of the sample-level energy extractor 160 is supplied to a non-coherent integrator 170, which essentially functions as a summer or averaging processor. Specifically, in operation 225 (FIG. 2), for each signal path detected in the correlation signal, the non-coherent integrator 170 sums the signal energy from the sample-level energy extractor 160 over L symbol blocks (i.e., several frames of data). Each frame of data can be considered a "snap shot" of the signal, which can be randomly affected by noise and fading. A single snap shot (frame) could be, for example, a few milliseconds worth of incoming data (e.g., an arriving TOA ranging waveform), which is the period of time (frame length) over which the correlator will attempt to correlate the data with the reference signal. The correlation (frame) length of N samples may comprise one or multiple spreading sequences. In each such snap shot, the receiver may be receiving the direct path as well as one or more multipath signals. By summing the energy of several such snap shots (after filtering by the energy extractors), the effects of noise and fading are essentially averaged out to some extent, thereby significantly mitigating their affect on the integrated (summed) signal relative to the signal of an individual frame and permitting a more accurate measurement of the strength of the peak signal. The process of summing the signals over multiple frames is performed for each detected peak (signal path) processed by the energy extractors. The integration process does not preserve signal phase information; however, this is inconsequential, since the signal phase information is lost from the signal prior to the non-coherent integrator due to the magnitude function (absolute value).

The non-coherent integrator produces a set of averaged signals V(k) corresponding to the energy-filtered peaks in the correlation signal, which represent k potential signal paths. These averaged signals are then passed on to a path searcher 180 for the task of identifying the legitimate paths from the noise floor. Essentially, the path searcher attempts to separate out and identify the direct path signal from a number of potential multipath signal which may be stronger than the direct path signal (operation 230 in FIG. 2).

The noise floor is computed by averaging the output of the non-coherent integrator. The noise floor is then used to identify peaks that are above the noise floor. Detected peaks can then be regenerated and subtracted from the received signal at the input of the correlator. The noise floor is updated at each iteration by performing the same process. Consequently, in the next iteration, the noise floor is computed by averaging the output of the integrator after the detected signal paths have been removed from the signal at the correlator input.

The noise floor is essentially used as a threshold in each iteration to determine whether the detected, averaged peaks represent signal paths of interest. More particularly, processing performed by the path searcher 180 is summarized in the flow diagram of FIG. 3. While a particular process for evaluating path signals is described with respect to FIG. 3, it should be appreciated that the invention is not limited to this one particular scheme or these specific operations. However, an important aspect of the invention is that an iterative process can be perform to remove one or more strong multipath signals that would otherwise mask and make undetectable a weaker direct path signal.

Figure 3:
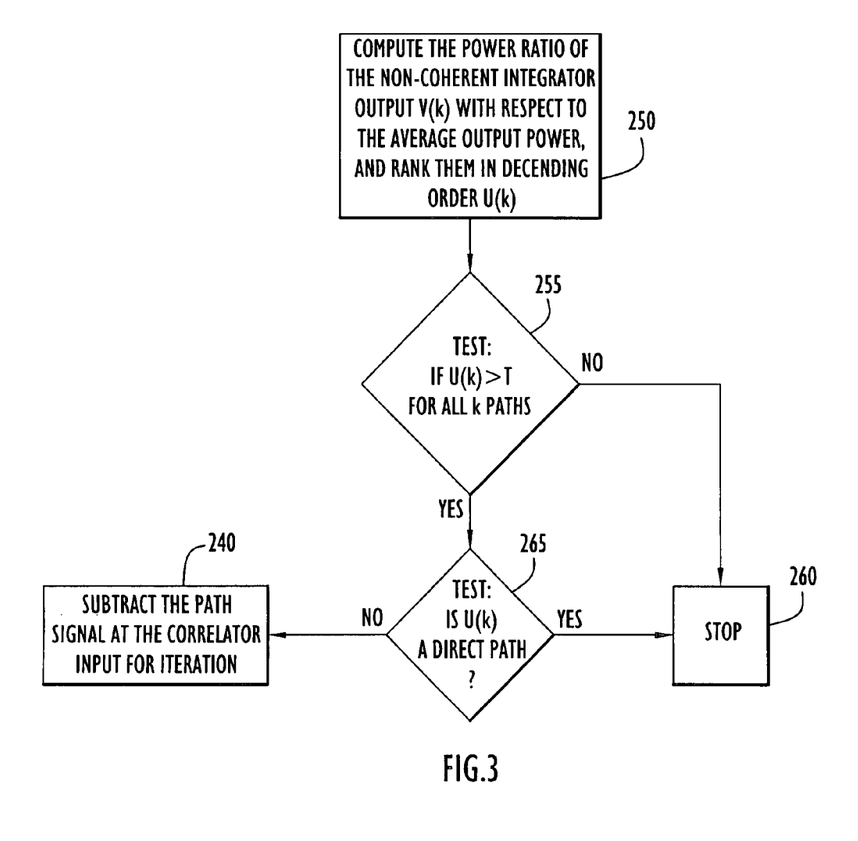
FIG. 3 is a functional flow diagram illustrating operations performed to evaluate whether detected signals correspond to the direct signal path according to an exemplary embodiment of the present invention.

Referring to FIG. 3, in operation 250, the power ratios of the non-coherent integrator outputs $V(k)$ are computed by taking the power of each element $V(k)$ and dividing by the noise floor. The power ratios are then ranked in descending order $U(k)$. Next, in operation 255, the ranked power ratios are compared to a pre-determined threshold T (e.g., T=3 dB), and each power ratio that exceeds the threshold T is declared to be valid and corresponds to a valid signal path (which may be the direct path signal or a multipath signal). The path signals so identified are recorded and tracked in each iteration.

The power ratios $U(k)$ identified as corresponding to valid path signals are then evaluated (operation 265) to determine whether one of the path signals is the direct path signal. Here again, any of a variety of criteria can be used to make a final determination of whether the direct path signal has been successfully identified. In general, if in a particular iteration, plural peaks have been identified as corresponding valid signal paths, the earliest of these peaks is a possible candidate to be the direct path signal. On the other hand, the earliest peak detected in a particular iteration may be a strong multipath signal, and the direct path signal may be much weaker (e.g., 20 dB down) and may not have been detected. If the strongest signal is substantially above the noise floor or substantially greater than the next strongest signal (and thereby has the potential to mask weaker signals) and/or is not particularly early in the correlation signal profile, there is significant likelihood that the true direct path has not been detected in the initial correlation of the received signal. If none of the signals can confidently be declared the direct path signal, a second iteration is performed in which the signal of the strongest "dominant" path signal detected from the first correlation is regenerated and subtracted from the originally received signal data (operation 240 in FIGS. 2 and 3) before repeating the process. Optionally, more than one dominant path can be regenerated and subtracted in a single iteration, particularly if the timing or characteristics of the signals suggest that plural signals are strong multipath signals rather than the direct path signal. Otherwise, where more than one signal needs to be subtracted, the strongest remaining signal can be subtracted, with a single signal being remove with each subsequent iteration, until the direct path signal is detected.

The dominant path signal (or strongest remaining signal) to be subtracted can be regenerated from known information. Specifically, the signals from all detected paths have the same spreading function, since they are all basically delayed versions of the same reference signal. The timing of the dominant signal is known from the position of the detected peak, and the phase information can be obtained at the output of the correlator (phase information is lost in subsequent processing, as previously described). The signal amplitude can be obtained from the output of the non-coherent integrator, which has been averaged over L frames for improved accuracy.

With the foregoing information, a path regenerator 195 (FIG. 1) regenerates a "clean" version of the signal timed to correspond to the timing of the detected dominant path signal, with the appropriate phase and amplitude, and supplies the regenerated path signal to subtractor 120, which subtracts the regenerated dominant path from the original signal data, which has been stored in a buffer or memory. The result is signal data in which the contribution of the dominant signal has been removed from the composite signal. The processing of the signal data is then repeated in the same manner as in the first pass, beginning with correlating the signal with the reference signal. With the dominant path signal removed, the noise floor computed at the output of the correlator is lower, and correlation peaks of weaker signals, which may include the direct path signal, may become evident in the correlation signal. Thus, when a dominant path or paths are detected, their signal strength and phase are estimated for the purpose of reconstructing the original paths' signal to aid the task of subtracting their contribution to the total received signal at the correlator input.

The iterative process is performed repeatedly until the direct path signal is detected (block 190 in FIG. 1, block 260 in FIG. 3), with the strongest remaining signal(s) being regenerated and subtracted with each successive iteration. With each iteration, there is a more complete multipath profile to subtract from the received signal, thereby increasing the likelihood that the direct path signal is detectable. Note that the regenerated path signals are subtracted from the same, original, detected signal data in each iteration. In other words, the same received signal is repeatedly processed throughout the iterative process, rather than new or different data.

If, in a certain iteration, the power ratios of all of the detected peaks are fairly comparable and relatively small (i.e., close to the noise floor), it can be assumed with greater confidence that the signals are approaching the noise floor and that direct path signal is among the remaining peaks being detected, since larger, dominant multipath signals have been removed. Optionally, the iterative process can be repeated until only noise is present and no peaks exceed the threshold in the path searcher, at which point the earliest of the peaks previously detected and recorded can be declared the direct path. However, it may be possible to confidently declare a specific signal as being the direct path signal prior to subtraction and removal of all signals, depending on the timing of the earliest peak and/or how stable the multipath signal profile remains after the I-th iteration (e.g., if the profile remains unchanged). Once the direct path signal has been identified, the direct path signal and its timing information can be supplied to the system processor for further processing and analysis (operation 235 in FIG. 2).

Figure 4:
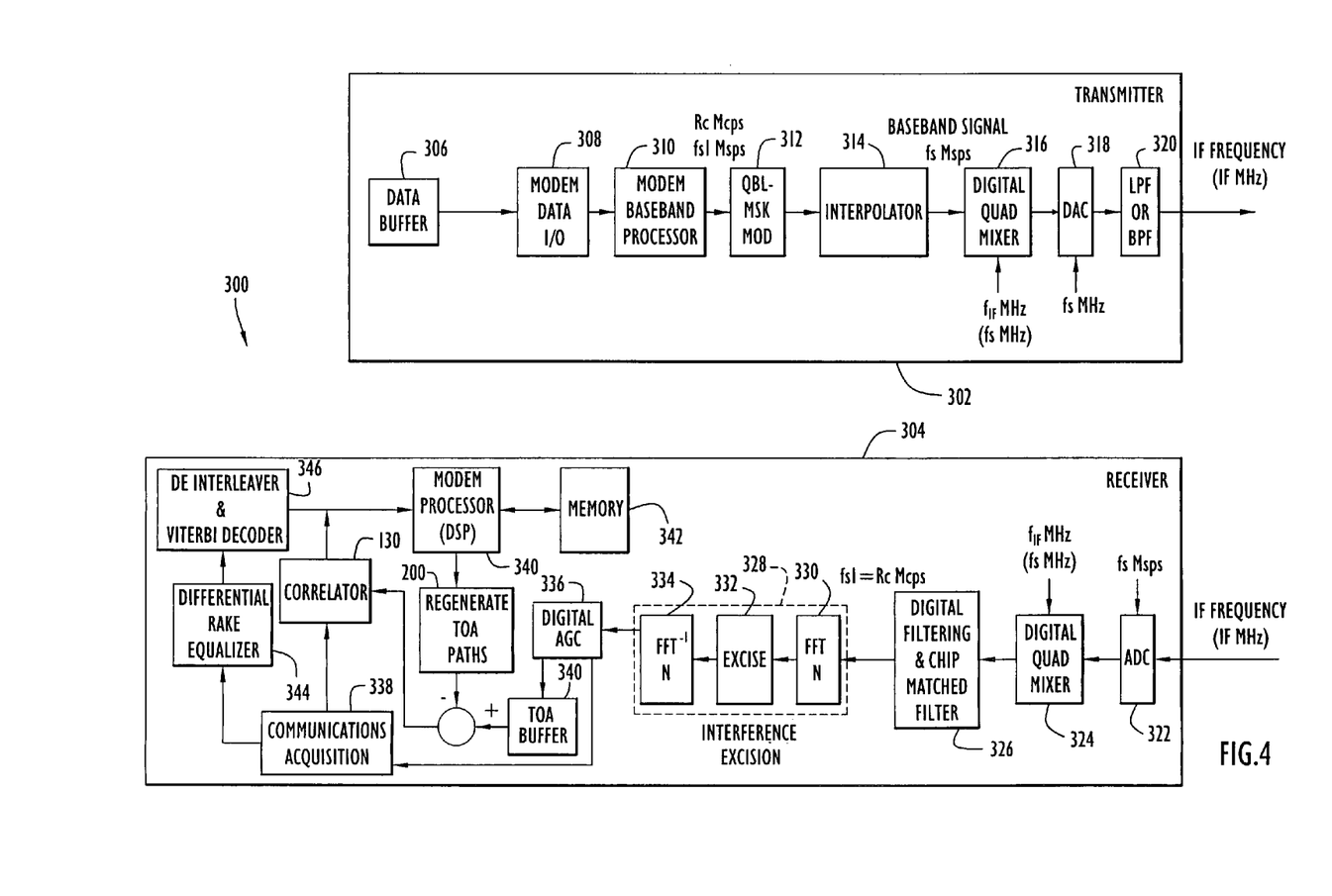
FIG. 4 is a functional block diagram illustrating a modem architecture employing the iterative detection technique to detect time-of-arrival (TOA) ranging signals in accordance with an exemplary embodiment of the present invention.

FIG. 4 illustrates a block diagram of a spread spectrum modem 300 that employs the iterative detection technique of the present invention in the context of performing time-of-arrival (TOA) ranging. Modem 300 includes a transmitter 302 and a receiver 304. Transmitter 302 functions to convert an outbound digital signal to an intermediate frequency, spread spectrum signal that is subsequently up-converted to RF and transmitted via an antenna (not shown). Receiver 304 processes a received signal after down-conversion to IF and essentially recovers the transmitted waveform and information contained therein.

The signal to be transmitted or received by modem 300 can be any of a variety of communication or navigation signals. For example the signal can be a communication signal containing data, audio (voice) or video information. The signal can also be a signal used in navigation, such as a ranging pulse used to determine the position of a communication device or the range to another device or object by precisely measuring time of arrival. Examples of such signals are described in U.S. Pat. Nos. 6,453,168 and 6,801,728 described above. More particularly, the systems described in these patents employ a two-way, round-trip ranging message scheme in which the time of arrival of the ranging messages is accurately determined to yield accurate range estimates used to calculate the position of a mobile radio via trilateration. A master mobile radio transmits outbound ranging messages to plural reference radios. The reference radios respond by transmitting reply ranging messages each indicating the location of the reference radio. Upon reception of the reply ranging message, the master radio determines the signal propagation time, and hence range, by subtracting a known turn around time (i.e., the time between reception of the outbound ranging message and the transmission of the reply ranging message) and internal processing delays from the elapsed time between transmission of the outbound ranging message and the time of arrival of the reply message. In this manner, the individual radios do not need to be synchronized to a common time reference, thereby eliminating the need for highly accurate system clocks required in conventional time-synchronized systems. The brief ranging messages can be interleaved with voice and data messages in a non-intrusive manner to provide position determining capabilities without disruption of voice and data communications. For example, a messaging protocol similar to that used in Carrier Sense Multiple Access with Collision Avoidance (CSMA/CA) can be used.

To provide high accuracy range estimates, the time of arrival of the ranging messages are precisely estimated. By performing internal delay calibration, errors caused by difficult-to-predict internal transmitter and receiver delay variations can be minimized. These systems use state-of-the-art spread spectrum chipping rates and bandwidths to reduce multipath interference, taking advantage of existing hardware and software to carrying out a portion of the TOA estimation processing. Frequency diversity can be used to orthogonalize multipath interference with respect to the direct path signal, wherein an optimal carrier frequency is used to estimate the TOA to minimize the impact of multipath interference, as previously described.

Further, the systems described in these patent documents are self-healing. Unlike conventional systems that require communication with a set of fixed-location reference radios, these systems can use a set of fixed and/or mobile reference radios. The set of radios relied upon to determine the location of a mobile communication device can vary over time depending on transmission conditions and the location of the mobile communication device. Any combination of fixed or mobile radios of known positions can be used as the reference radios for another mobile radio in the system, thereby providing adaptability under varying conditions. The ranging and position determining technique is useful in a wide variety of applications, including location and/or tracking of people and items such as: military personnel and equipment, emergency personnel and equipment, valuable items, vehicles, mobile telephones, children and prisoners.

Referring again to the modem architecture shown in FIG. 4, a processor (not shown) generates an initial digital signal to be transmitted, and the digital signal is buffered in data buffer 306. The transmitter's modem data I/O 308 receives the digital signal from buffer 306 and supplies the signal to a modem baseband processor 310. Modem baseband processor 310 performs modulation to convert the bits of the input digital signal into symbols at a symbol rate of $f_{s1}$ symbols per second (sps) and also applies spread spectrum chipping to the symbols at a chipping rate $R_c$ chips per second (cps) to produce a digital baseband direct sequence spread spectrum signal comprising a stream of samples of chips. Modem baseband processor 310 may also conventionally include a convolutional encoder that applies coding to the bits and performs an interleaving function that essentially scrambles the bits to achieve better performance. Each chip is then shaped by the QBLMSK (Quasi Band Limited Minimum Shift Keying) modulator 312.

The signal from the baseband modulator (i.e., the stream of baseband chip samples) is supplied from QBLMSK modulator 312 to an interpolator 314 which adjusts the sampling rate of the samples to a rate that matches a downstream mixer and digital-to-analog converter, increasing the rate from a frequency $f_{s1}$ to a frequency $f_s$. The interpolated signal, which is at baseband, is supplied to a digital quad mixer 316 that digitally mixes the baseband signal with an intermediate frequency (IF) signal to up-convert the baseband signal to a digital IF signal. The digital IF signal is then converted to an analog signal by digital-to-analog converter 318 and passed through a reconstruction filter 320 comprising a low pass filter or a bandpass filter to produce an output IF signal. After up-conversion to RF, the signal is transmitted via an antenna (not shown).

Optionally, a non-contiguous spectrum selector (not shown) can be used downstream of modulator 312 to remove specific frequency components from the signal, as described in pending U.S. patent application Ser. No. 10/695,484, the disclosure of which is incorporated herein by reference in its entirety. This operation can be advantageous, for example, where a portion of the frequency band cannot be used for transmission within the overall frequency band of the signal. By way of non-limiting example, the following parameters can be used to generate the signal in foregoing system: spread spectrum chip rate $(R_c)$=64 Mcps; initial sample rate $(F_{s1})$=128 Msps; interpolated sample rate $(F_s)$=256 Msps; and an intermediate frequency $(F_{IF})$=70 MHz.

The receiver (demodulator) 304 shown in FIG. 4 is configured to process the spread spectrum signal at the chip rate generated by the transmitter (modulator) 302 of a device sending an inbound transmission. Receiver 304 is supplied the received IF signal after down-conversion from RF and converts the IF signal to a digital IF signal via analog-to-digital converter 322. Digital quad mixer 324 down-converts the digital IF signal to baseband, and the sample rate of the digital baseband signal is adjusted from $f_{s1}$ to $f_s$ by digital filtering and chip matched filter 326.

Optionally, receiver 304 can include a receiver spectrum selector 328 (selector 328 is shown in dashed lines to indicate that it is optional). If the receiver spectrum selector is omitted, this portion of the receiver essentially operates in a conventional manner or, in the exemplary case shown in FIG. 4, the receiver operates in the manner described in the aforementioned patent documents. The receiver spectrum selector essentially notches out or nulls specific portions of the frequency band of the signal in which a known interference signal is being received. More specifically, receiver spectrum selector 328 includes: a discrete Fourier transform module 330 (e.g., an FFT) that converts the digital baseband time-domain signal into a frequency-domain signal; an excision module 332 that excises the frequency bins of the frequency-domain signal that correspond to those frequency bins receiving a strong interference signal; and an inverse discrete Fourier transform module 334 (e.g., an inverse FFT) that converts the excised frequency-domain signal to an excised time-domain signal at baseband.

Interference excision is particularly useful if narrowband interference or jamming is expected. A narrowband interferer typically covers one or a few frequency bins. With a spread spectrum signal having a relatively wide bandwidth spanning hundreds or thousands of frequency bins, the receiver can afford to lose the small portion of the overall signal corresponding to the narrowband interference without substantial degradation to detection of the spread spectrum signal. Even if the receiver does not include a spectrum selector for excising non-allocated frequency segments from the received signal, the receiver may still include a conventional interference excision module in situations where narrowband interference or jamming is likely or expected.

In the exemplary modem shown in FIG. 4, the system is capable of transmitting communication signals (e.g., data, audio/voice, video, etc.) interleaved with time-of-arrival ranging signals used for navigation. Thus, after apply gain control to the excised digital baseband received signal in digital automatic gain control (AGC) module 336, the signal is supplied both to a communications acquisition module 338 and a TOA buffer 340, which corresponds to the TOA buffer (ranging data) 110 shown in FIG. 1. When either a communication signal or a ranging signal is received, the communication acquisition module 338 acquires the coarse timing of the signal.

In the case of a ranging signal, the communications acquisition module 338 triggers the TOA correlator 130 to precisely determine the time of arrival of the ranging signal. In the configuration shown in FIG. 4, modem processor 340 essentially performs the functions associated with the following function blocks shown in FIG. 1: magnitude function 140, energy extractors 150 and 160, non-coherent integrator 170, path searcher 180, and direct path determination logic 190. On successive iterations, modem processor 340 instructs the appropriate regenerated TOA paths (200) to be subtracted from the stored TOA ranging data in the manner described above in order to ultimately identify the direct path signal. Once the direct path signal is identified, the resulting signal timing information is stored in the modem processor 340 (supported by memory 342), which computes range and determines position.

For communication signals, the acquired signal is supplied from the communications acquisition module 338 to a differential rake equalizer 344 that identifies the predominant multipath channels and sums the multipath signals appropriately time-delayed to increase the combined signal-to-noise ratio for communications performance improvement. A de-interleaver and Viterbi decoder 346 essentially decodes and deinterleaves (descrambles) the coding and interleaving functions applied in the modem baseband processor. The resulting digital signal is then supplied to modem processor 340 where the final bits are accumulated and supplied to a destination application (e.g., a data, voice or video application).

Figure 5:
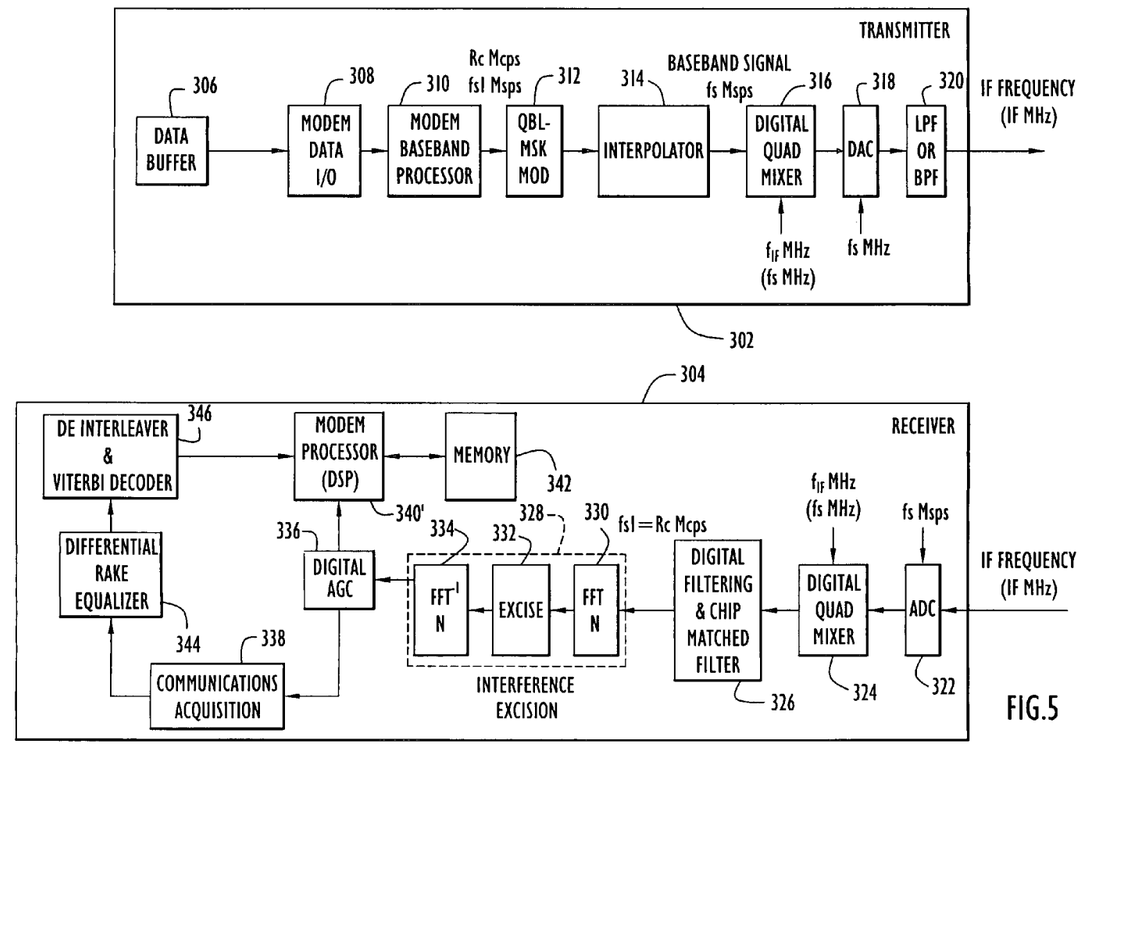
FIG. 5 is a functional block diagram illustrating another modem architecture employing the iterative detection technique to detect time-of-arrival (TOA) ranging signals in accordance with an exemplary embodiment of the present invention.

In the configuration of spread spectrum modem 300 shown in FIG. 4, the iterative detection is implemented, at least in part, in hardware. That is, the data buffering, correlator, signal regeneration, and signal differencing operations can be performed using hardware components which cooperate with the signal and data processing operations performed by the modem processor 340. Another option is depicted in FIG. 5, in which most or all of these operations are carried out using the modem processor 340'. In this case, the digitized baseband signal can be supplied directly to the modem processor, which essentially performs the operations of the functional blocks shown in FIG. 1 via software processes.

It will be appreciated that the architecture depicted in the figures are conceptual in nature and designed to illustrating major functional units and operations, and do not necessarily illustrate physical relationships or specific equipment or implementations. In general the iterative detection technique of the present invention can be carried out using any suitable hardware, software, or combinations of hardware and software.

The performance of this inventive iterative detection technique is simulated by modeling the TOA ranging waveform, and the detection algorithm in Simulink™. An augmented Gold code with length 32 is chosen for the ranging waveform (i.e., the received TOA ranging data) with BPSK modulation at a chip rate of 4 Mcps. An over-sampling rate of 16 is assumed for greater ranging accuracy. The correlator output length N is set at 1024, and the integrator length L is set at 64 symbol blocks. To prevent paths from being correlated among themselves in the simulation, the phase angle of each path is updated with a uniformly distributed random variable ($-2\pi$, $2\pi$) at the symbol rate (every 32 chips). An operating point of Ec/No=6 dB with respect to the direct path is chosen for modeling purpose. Three severe indoor multipath channels are selected for characterizing the performance of the iterative detection. The results from simulations are summarized below.

For the indoor multipath channel A shown in Table 1, the direct path is 20 dB below two equal-strength dominant paths that are delayed by 15 and 160 samples relative to the direct path. The first correlation at the path searcher output reveals the two strong paths at distance 15 and 160 samples away from the correlator center point, i.e., direct path position. In this example, however, the weaker direct path signal is not detected from the first correlation, since the noise floor is set too high due to the presence of the two strong multipath signals. The magnitudes for the two detected paths are estimated at the non-coherent-integrator output and the phases are obtained at the correlator output. The re-constructed path signals for both of the detected multipath signals are then subtracted from the correlator input for the subsequent iteration (i.e., the first iteration). The integrator output from the first iteration successfully reveals the direct path. Essentially, with the strong multipath signals having been subtracted from the detected ranging data, the noise floor is substantially lower, and the signal peak from the direct path signal becomes evident at the non-coherent integrator output. Upon recognizing the early timing of the direct path signal and/or upon not finding any additional signal peaks or any earlier signal peaks in a subsequent iteration, this signal is declare the direct path signal.

For the indoor multipath channel B shown in Table 2, the direct path signal has the same signal strength as one of the multipath signals, while another multipath signal is 20 dB stronger. The iterative detection technique again is able to detect the direct path with only one iteration. In this case, the strong multipath signal is detected in the initial correlation and then subtracted from the buffered ranging signal. Both the direct path signal and the equal-strength multipath signal are then detected at the integrator output, and the direct path signal is identified due to its earlier timing.

For the indoor multipath channel C shown in table 3, the direct path is dominated by two other strong paths, that are 10 and 20 dB stronger, respectively. Two iterations (three passes) are required in this case to reveal the direct path signal. Here, the initial correlation detects the stronger multipath signal, but not the weaker (second-strongest) multipath signal or the even weaker direct path signal. Upon subtracting the regenerated strong multipath signal from the received ranging signal, the first iteration reveals the second strongest multipath signal, but not the weaker direct path signal. Upon subtracting the regenerated second-strongest multipath signal from the received ranging data, the second iteration finally reveals the direct path signal.

TABLE 1

Indoor Multipath Channel A

| Tap | Delay (samples) | Relative Power (dB) |
|---|---|---|
| 1 | 0 | −20 |
| 2 | 15 | 0 |
| 3 | 160 | 0 |

TABLE 2

Indoor Multipath Channel B

| Tap | Delay (samples) | Relative Power (dB) |
|---|---|---|
| 1 | 0 | −20 |
| 2 | 15 | −20 |
| 3 | 160 | 0 |

TABLE 3

Indoor Multipath Channel C

| Tap | Delay (samples) | Relative Power (dB) |
|---|---|---|
| 1 | 0 | −20 |
| 2 | 15 | −10 |
| 3 | 160 | 0 |

For purposes of illustration, the iterative detection operation has described herein in the context of a direct sequence spread spectrum modem. However, it will be understood that the described technique can be employed in virtually any communication or navigation device required to transmit and receive wireless signals and is not limited to any particular modem configuration. More generally, the iterative detection technique is not limited to use within a modem and can be employed in any communication device that receives wireless signals, irrespective of whether the communication device also transmits signals.

The described invention has applicability in virtually any communication or navigation system that can benefit from a more accurate determination of signal timing, improved multipath rejection capability, or potentially improved system performance resulting therefrom, such as higher possible data rates, lower bit error rates, and greater likelihood of signal acquisition/detection.

The technique of the present invention can be implemented in a system that easily fits within the physical footprint of mobile communication device, such as a handheld spread spectrum radio, permitting the system to be used in a wide variety of applications. Where the system supports both communications and navigation, as in the exemplary embodiment, the system can be used to provide situation awareness in military exercises, to determine and track the location of military personnel and/or equipment during coordination of field operations. This would be particularly useful in scenarios where GPS signals are weak or unavailable due to atmospheric conditions, terrain or location of the radio inside a building, or to augment and enhance the accuracy of GPS position information. The position information can be used by a commander to dynamically map the current position of personnel and equipment and to coordinate further movements. Further, individual mobile radios can receive and display position information for other related personnel, so that soldiers in the field are provided with situation awareness for their immediate surroundings.

The technique of the present invention can also be used to enhance systems that locate and track non-military personnel and resources both indoors or outdoors, including but not limited to: police engaged in tactical operations; firefighters located near or within a burning building; medical personnel and equipment in a medical facility or en route to an emergency scene; and personnel involved in search and rescue operations. The technique of the present invention is also useful in systems used to track high-value items by tagging items or embedding a mobile radio in items such as personal computers, laptop computers, portable electronic devices, luggage (e.g., for location within an airport), briefcases, valuable inventory, and stolen automobiles.

In urban environments, where conventional position determining systems have more difficulty operating, the present invention can be used to support systems that track fleets of commercial or industrial vehicles, including trucks, buses and rental vehicles equipped with mobile radios. Tracking of people carrying a mobile communication device is also desirable in a number of contexts, including, but not limited to: children in a crowded environment such as a mall, amusement park or tourist attraction; location of personnel within a building; location of prisoners in a detention facility; or to track the movements of parolees. The mobile radio could be carried on the body by incorporating the radio into clothing, such as a bracelet, a necklace, a pocket or the sole of a shoe. The present invention can also be applied in systems used in locating the position of cellular telephones (e.g., E-911 applications). This capability could also be used to assist in cell network management (e.g., in cell handoff decisions).

Of course, the present invention is equally applicable in communication devices and networks of communication devices that transmit only communication signals (e.g., data, audio, video), only navigation signals, or virtually any type of spread spectrum or wideband signal. Further, the invention can be used in fixed-position communication devices that transmit as well as mobile communication devices.

While the present invention has been described above in the context of a system that transmits and receives electromagnetic signals through the air, it will be appreciated that the two-way round-trip ranging technique, including the internal delay calibration and TOA processing can be used in other mediums and with other types of signals, including, but not limited to: electromagnetic signals transmitted through solid materials, water or in a vacuum; and pressure waves or acoustic signals transmitted through any medium (e.g., seismic, sonar or ultrasonic waves).

Having described preferred embodiments of new and improved methods and apparatus for measuring signal timing, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. An apparatus for determining the timing of a received signal, the received signal including one or more time-delayed versions of a reference signal traveling over respective different signal paths, the apparatus comprising:

a correlator configured to iteratively correlate the received signal with the reference signal to produce a correlated signal;

a chip-level energy extractor configured to emphasize the correlated signal in peak chips containing signal peaks by reducing the amplitude of the correlated signal in other chips, wherein the signal peaks correspond to potential signal paths of the received signal;

a sample-level energy extractor configured to emphasize the correlated signal in peak samples in the peak chips by reducing the amplitude of other samples in the peak chips; and a processor configured to iteratively modify the received signal supplied to the correlator until the processor determines that the correlated signal includes a signal peak corresponding to a direct path of the received signal, the direct path providing the timing of the received signal, wherein in each iteration, the processor regenerates the reference signal corresponding to at least a greatest signal peak in the correlated signal and modifies the received signal supplied to the correlator to remove contributions from the regenerated reference signals, such that the correlated signal in successive iterations excludes contributions from signals determined in previous iterations not to correspond to the direct path.

2. The apparatus of claim 1, wherein, in each iteration, the correlator correlates the received signal in a plurality of sequential frames, each frame including N samples corresponding to a correlation length of the correlator, wherein the processor comprises:

a non-coherent integrator configured to integrate energy of signal peaks from the plurality of sequential frames to produce averaged signal peaks;

a path searcher configured to determine whether one of the averaged signal peaks corresponds to the direct path;

a path regenerator configured to regenerate the reference signal corresponding to at least the averaged signal peak having the highest energy in response to the path searcher not determining that any of the averaged signal peaks corresponds to the direct path; and a subtractor configured to subtract each regenerated reference signal which corresponds to the detected signal peak from the received signal prior to supplying the received signal to the correlator for a subsequent iteration.

3. The apparatus of claim 2, wherein the path regenerator regenerates the reference signal from the amplitude, phase, and timing of peak signals in the correlated signal that have not been determined to correspond to the direct path.

4. The apparatus of claim 1, wherein the received signal is a spread spectrum signal.

5. The apparatus of claim 1, wherein the received signal is a time-of arrival ranging signal used in navigation.

6. The apparatus of claim 1, wherein the apparatus is a receiver.

7. The apparatus of claim 1, wherein the apparatus is a modem.

8. The apparatus of claim 1, wherein the apparatus is a communication device.

9. A method for determining the timing of a received signal, the received signal including one or more time-delayed versions of a reference signal traveling over respective different signal paths, the method comprising:

(a) correlating the received signal with the reference signal to produce a correlated signal;

(b) extracting energy of the correlated signal at a chip level to emphasize the correlated signal in peak chips containing signal peaks, wherein the signal peaks correspond to potential signal paths of the received signal;

(c) extracting energy of the correlated signal at a sample level to emphasize the correlated signal in peak samples in the peak chips;

(d) determining whether a signal peak of the correlated signal corresponds to the direct path of the received signal, the direct path providing the timing of the received signal; and (e) iteratively repeating (a) through (d) until a signal peak is determined to correspond to the direct path of the received signal, wherein each successive iteration includes: regenerating the reference signal corresponding to at least a greatest signal peak in the correlated signal; and eliminating from the received signal contributions from each regenerated reference signal, such that the correlated signal in successive iterations excludes contributions from signals determined in previous iterations not to correspond to the direct path.

10. The method of claim 9, wherein, in each iteration:

(a) includes correlating the received signal in a plurality of sequential frames, each frame including N samples corresponding to a correlation length; and (d) includes:

integrating energy of signal peaks from the plurality of sequential frames to produce averaged signal peaks;

determining whether one of the averaged signal peaks corresponds to the direct path;

in response to no determination that one of the averaged signal peaks corresponds to the direct path, regenerating the reference signal corresponding to at least the averaged signal peak having the highest energy; and subtracting each regenerated reference signal from the received signal to be correlated in a subsequent iteration.

11. The method of claim 10, wherein the regenerated reference signal is regenerated from the amplitude, phase, and timing of peak signals in the correlated signal that have not been determined to correspond to the direct path.

12. An apparatus for determining the timing of a received signal, the received signal including one or more time-delayed versions of a reference signal traveling over respective different signal paths, the apparatus comprising:

means for iteratively correlating the received signal with the reference signal to produce a correlated signal;

means for emphasizing the correlated signal in peak chips containing signal peaks by reducing the amplitude of the correlated signal in other chips, wherein the signal peaks correspond to potential signal paths of the received signal;

means for emphasizing the correlated signal in peak samples in the peak chips by reducing the amplitude of other samples in the peak chips;

means for determining whether the correlated signal includes a signal peak corresponding to a direct path of the received signal, the direct path providing the timing of the received signal, wherein correlation iterations cease once a signal peak is determined to correspond to the direct path;

means for regenerating, in each iteration, the reference signal corresponding to at least a greatest signal peak in the correlated signal in response to no signal peak being determined to correspond to the direct path; and means for modifying, in each iteration, the received signal to be correlated to remove contributions from the regenerated reference signals, such that the correlated signal in successive iterations excludes contributions from signals determined in previous iterations not to correspond to the direct path.

13. The apparatus of claim 1, wherein:

the chip-level energy extractor comprises a first mask that is placed at the center of a signal peak to enhance its correlation value and null interference from other chips; and the sample-level energy extractor comprises a second mask that is placed at the center of the signal peak to enhance its correlation value and null interference within the same chip.

14. The apparatus of claim 13, wherein the first and second masks are time-domain filters that selectively apply weights to correlator output samples.

15. The apparatus of claim 13, wherein a set of first and second masks are employed for each signal peak detected in the correlated signal.

16. The method of claim 9, wherein:

(b) includes placing a first mask at the center of a signal peak to enhance its correlation value and null interference from other chips; and (c) includes placing a second mask at the center of the signal peak to enhance its correlation value and null interference within the same chip.

17. The method of claim 16, wherein (b) and (c) are performed for each signal peak detected in the correlated signal.

\* \* \* \* \*